US011012413B2

(12) United States Patent
Katz et al.

(10) Patent No.: US 11,012,413 B2
(45) Date of Patent: May 18, 2021

(54) DEVICE AND METHOD FOR SECURING A NETWORK CONNECTION

(71) Applicant: BYOS INC., Ottawa (CA)

(72) Inventors: Matias David Katz, Halifax (CA); Cristian Amicelli, San Antonio de Padua (AR)

(73) Assignee: BYOS INC., Ottawa (CA)

(*) Notice: Subject to any disclaimer, the term of this patent is extended or adjusted under 35 U.S.C. 154(b) by 0 days.

(21) Appl. No.: 16/603,391

(22) PCT Filed: Jan. 16, 2019

(86) PCT No.: PCT/IB2019/050347
§ 371 (c)(1),
(2) Date: Oct. 7, 2019

(87) PCT Pub. No.: WO2019/142115
PCT Pub. Date: Jul. 25, 2019

(65) Prior Publication Data
US 2020/0344211 A1 Oct. 29, 2020

Related U.S. Application Data

(60) Provisional application No. 62/618,457, filed on Jan. 17, 2018.

(51) Int. Cl.
*H04L 29/06* (2006.01)
(52) U.S. Cl.
CPC ........ *H04L 63/0236* (2013.01); *H04L 63/101* (2013.01); *H04L 69/22* (2013.01)

(58) Field of Classification Search
CPC .......................... H04L 63/0236; H04L 63/101
(Continued)

(56) References Cited

U.S. PATENT DOCUMENTS 9,781,134 B2 * 10/2017 Huang ................ H04L 63/0876
2004/0093513 A1 5/2004 Cantrell et al.
(Continued)

OTHER PUBLICATIONS

ISA/CA, International Search Report and Written Opinion, dated May 3, 2019, re International PCT Patent Application No. PCT/IB2019/050347.

*Primary Examiner* — Anthony D Brown
(74) *Attorney, Agent, or Firm* — Dentons Canada LLP

(57) ABSTRACT

A network security device mediates communications between a client computing device and a network. The network security device includes a memory storing packet header verification rules defining parameters for structure and content of packet headers. The network security device further includes a communications interface to connect to the client computing device and the network. The network security device further includes a processor interconnected with the memory and the communications interface. The processor is configured to: in response to receiving an incoming packet from the network for transmission to the client computing device, extract an incoming header from the incoming packet. The processor is further configured to perform a verification of structure and content of the incoming header according to the packet header verification rules. The processor is further configured to: in response to a successful verification of the incoming header, transmit the incoming packet to the client computing device.

40 Claims, 8 Drawing Sheets

(58) Field of Classification Search
USPC .......................................................... 726/13
See application file for complete search history.

(56) References Cited

U.S. PATENT DOCUMENTS

| | | | |
|---|---|---|---|
| 2007/0162587 A1* | 7/2007 | Lund | H04L 67/2819 |
| | | | 709/223 |
| 2007/0192593 A1 | 8/2007 | Boisjolie et al. | |
| 2008/0002567 A1* | 1/2008 | Bourlas | H04L 7/048 |
| | | | 370/208 |
| 2015/0023154 A1* | 1/2015 | Parisien | H04L 45/22 |
| | | | 370/225 |
| 2016/0212160 A1 | 7/2016 | Jiang | |
| 2016/0373325 A1* | 12/2016 | Shanks | H04L 43/04 |

* cited by examiner

DEVICE AND METHOD FOR SECURING A NETWORK CONNECTION

FIELD

The specification relates generally to network devices, and more particularly to a device and method for securing a network connection.

BACKGROUND

The internet is ubiquitous: people can connect to the internet from anywhere from homes and offices, as well as public locations such as hotels, coffee shops, and restaurants. Public networks may not employ security measures and hence may pose security threats to users and their devices.

SUMMARY

An aspect of the specification is directed to a network security device to mediate communications between a client computing device and a network. The network security device includes a memory storing packet header verification rules defining parameters for structure and content of packet headers. The network security device further includes a communications interface to connect to the client computing device and the network. The network security device further includes a processer interconnected with the memory and the communications interface. The processor is configured to: in response to receiving an incoming packet from the network for transmission to the client computing device, extract an incoming header from the incoming packet. The processor is further configured to perform a verification of structure and content of the incoming header according to the packet header verification rules. The processor is further configured to: in response to a successful verification of the incoming header, transmit the incoming packet to the client computing device.

BRIEF DESCRIPTION OF DRAWINGS

Implementations are described with reference to the following figures, in which.

DETAILED DESCRIPTION

Current network security means are complex and may require a high level of technical sophistication to set up and use properly. Mitigating potential threats and attacks to computer security often requires a high level of knowledge to establish an acceptable level of protection. Further, many methods of securing networks merely detect patterns that match known security problems. These methods cannot synergistically analyze different threats, and do not provide adequate means to notify users or counter the threats.

A network security device can provide network security to a computing device connected to it. In particular, the network security device may be inline between a user's device and a network, and the user's device may interact with the network via the network security device. The network security device may therefore mediate communications between the network and the user's device, including autonomously analyzing, detecting and responding to threats in the communications. The network security device security features can include one or more of: eavesdropping detection and prevention; domain name system attack detection and prevention; infiltration detection and prevention; geographical access filter; traffic volume monitoring and control; direct attack detection; encrypted communication; and preliminary network verification. The network security device analyzes, compares, processes and verifies network information to determine whether the user's device is at risk. The network security device uses detailed identification of raw information received during a network session, assigns weight to identified attacks according to their severity and impact, and responds appropriately. The device may be configured to be technology-agnostic, allowing the device to provide the security features to devices, regardless of connection ports, operating system, or the like.

Figure 1:
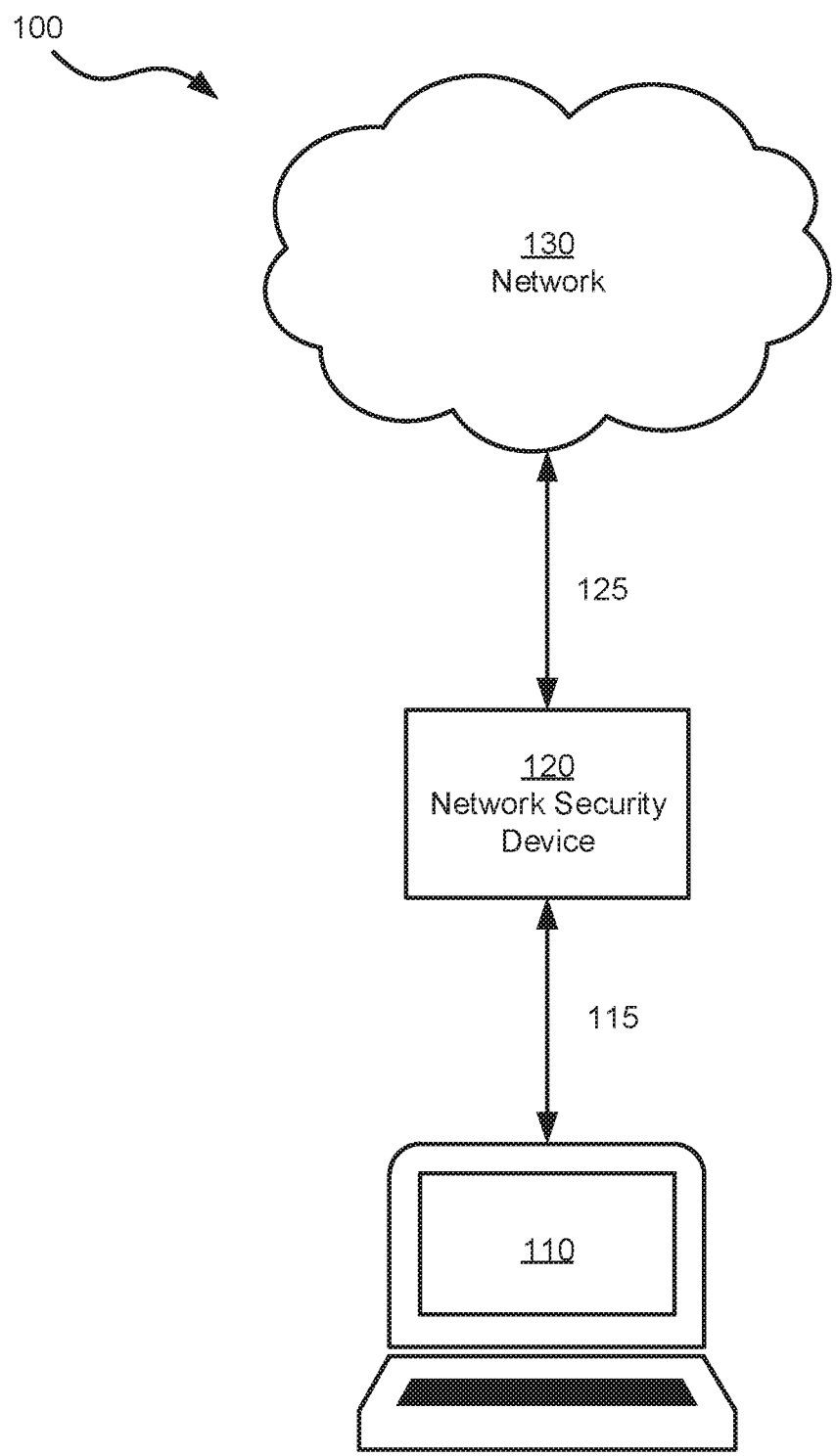
FIG. 1 depicts a schematic of an example system for securing a network connection.

FIG. 1 depicts an example system 100 for securing a network connection. The system 100 includes a client computing device 110 to connect to a network 130 via a network security device 120. The client computing device 110 may be a mobile computing device such as a tablet, smart phone, a laptop computer, or other suitable device. In some examples, the client computing device 110 may be a computing device such as a desktop computer, a kiosk, or the like. Generally, the client computing device 110 is a computing device capable of communicating over a network, such as the network 130. The client computing device 110 is connected to the network security device 120 via a communication link 115. The communication link 115 may be wired or wireless, or a combination of wired and wireless. For example, the communication link 115 can include a wired connection from the network security device 120 to the client computing device 110 via a universal serial bus (USB), ethernet, or other suitable port provided on the client computing device 110. In particular, the network security device 120 is configured to serve as a network interface for the client computing device 110 via the communication link 115.

The network 130 can include any one of or any combination of, a local area network (LAN) defined by one or more routers, switches, wireless access points or the like. The network 130 may also include any suitable wide area network (WAN) including cellular networks and the Internet. The network security device 120 is connected to the network 130 via a communication link 125. The communication link 125 may include IP networks, such as intranet, a local-area network, a wide-area network, a Wi-Fi network, a short-range wireless network, the internet, combinations of such, and the like. The communication link 125 may be a direct link, or a link that traverses one or more networks, including both local and wide-area networks.

Figure 2:
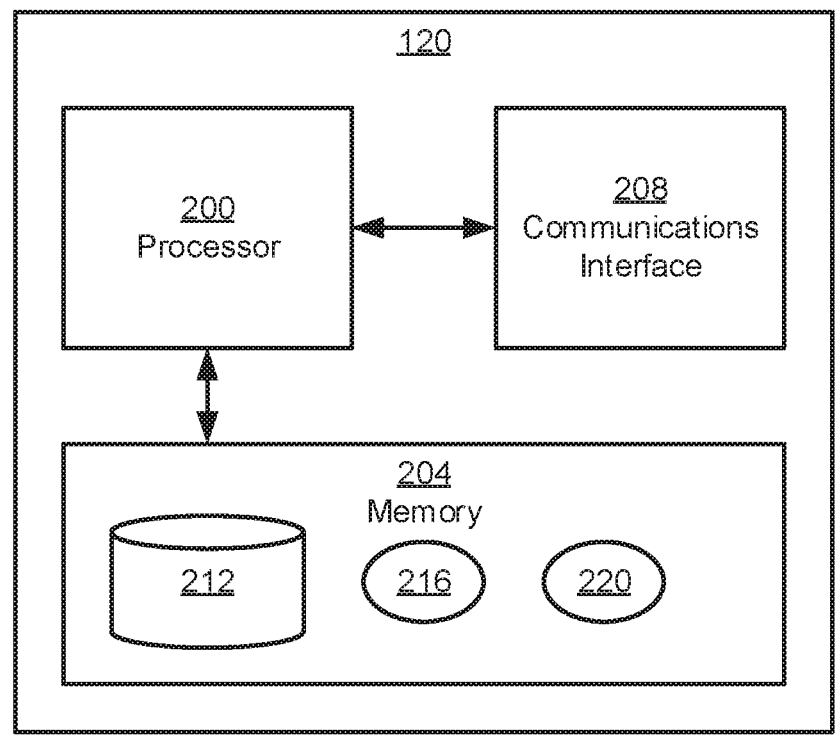
FIG. 2 depicts a block diagram of certain internal components of a network security device in the system of FIG. 1.

The network security device 120 (also referred to herein as simply the device 120) is configured to mediate communications between the client computing device 110 and the network 134. In particular, the device 120 monitors for threats and attacks to provide secure communications. Referring now to FIG. 2, a schematic of certain internal components of the network security device 120 is depicted.

The network security device 120 includes a processor 200, a non-transitory computer-readable storage medium, such as a memory 204, and a communications interface 208. The processor 200 may include a central-processing unit (CPU), a microcontroller, a microprocessor, a processing core, a field-programmable gate array (FPGA), or similar. The processor 200 may include multiple cooperating processors. The processor 200 may cooperate with the memory 204 to execute instructions to realize the functionality discussed herein. In particular, the processor 200 is configured to analyze network and packet information, as well as network traffic to autonomously make decisions about a security status of a session between the client computing device 110 and the network 130. The processor 200 may be configured to take corrective action. The processor 200 may implement one or more artificial intelligence and/or machine learning techniques to determine the security status and appropriate corrective actions based on network information, packet information, network traffic, session history, and operator configurations.

The memory 204 may include a combination of volatile (e.g. Random Access Memory or RAM) and non-volatile memory (e.g. read only memory or ROM, Electrically Erasable Programmable Read Only Memory or EEPROM, flash memory). All or some of the memory 204 may be integrated with the processor 200. In particular, the memory 204 stores a plurality of applications, each including a plurality of computer readable instructions executable by the processor 200. The execution of the instructions by the processor 200 configures the network security device 120 to perform various actions discussed herein. The applications stored in the memory 204 include a network security application 212 to mediate communications between the client computing device 110 and the network 130, as well as a dashboard application 216 to manage the security features of the network security device 120. The memory 204 further includes a repository 220 storing verification rules. In particular, the verification rules can include packet header verification rules, preliminary verification rules, network usage verification rules, and similar. For example, the packet header verification rules define parameters and criteria for structure and content of packet headers communicated between the client computing device 110 and the network 130 to establish a secure connection.

The network security device 120 further includes the communications interface 208 interconnected with the processor 200. The communications interface 208 includes suitable hardware (e.g. transmitters, receivers, network interface controllers and the like) allowing the network security device 120 to communicate with other computing devices, such as the client computing device 110 via the communication link 115, and the network 130 via the communication link 125. The specific components of the communications interface 208 are selected based on the type of network or other link that the network security device 120 communicates over. For example, the communications interface 208 may include both a wired USB connection and suitable transmitters and receivers to communicate with the client computing device 110, as well as a network interface controller to communicate to the network 130.

In operation, in some implementations, the communications interface 208 may be configured to utilize an encrypted communication protocol. For example, the memory 204 may pre-store encryption schemes for allowing the communications interface 208 to transmit encrypted communications. In some implementations, the device 120 can further host a domain name system (DNS) server storing, for example, addresses of trusted DNS servers (e.g. a DNS server external to the device 120), on the memory 204. Accordingly, during communications, in response to DNS requests, the processor 200 may be configured to retrieve the pre-stored address of a trusted DNS server from the memory 204. The processor 200 may then control the communications interface to forward the DNS request to the trusted DNS server via the encrypted communication protocol. Thus, DNS requests may be encrypted regardless of the locations of the client computing device 110 and the trusted DNS server. Accordingly, third parties may be prevented from observing DNS traffic and hinder phishing and/or DNS poisoning threats. Further, DNS information may be verified as being received from a trusted source. In other implementations, the communications interface 208 may further be configured to establish a virtual private network (VPN) to one or more VPN servers. In some implementations, the communications interface 208 can include multiple communications interfaces for communicating via different communication links.

Figure 3:
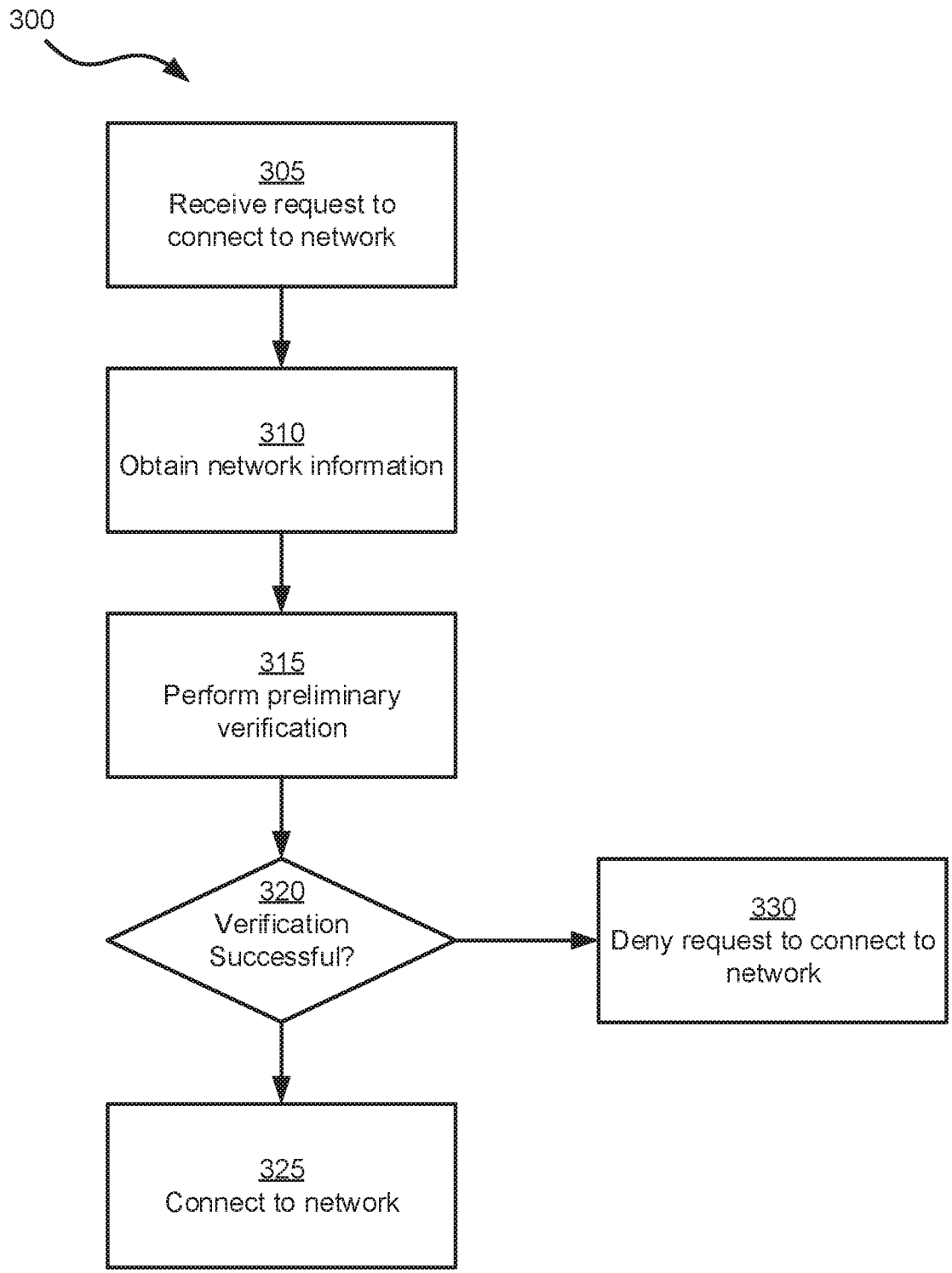
FIG. 3 depicts a flowchart of an example method of performing a preliminary verification of a network connection in the system of FIG. 1.

Referring now to FIG. 3, an example method 300 for initializing mediated communications between the client computing device 110 and the network 130 is depicted. The method 300 will be described in conjunction with its performance in the system 100, and in particular, with reference to the components illustrated in FIGS. 1 and 2. It is contemplated that in other implementations, the method 300 can be performed by other suitable systems. In particular, the method 300 initiates a session defined by the series of communications (i.e. transmissions between the network and the client computing device) during the span of the connection between the client computing device 110 and the network 130. The session may be defined by the connection of the client computing device 110 and the network 130 as mediated by the network security device 120.

The method 300 is initiated at block 305, wherein the device 120 receives a request from the client computing device 110 to connect to the network 130, For example, the request to connect to the internet may be initiated by an operator of the client computing device 110, such as by an interaction with the dashboard application 216. For example, the dashboard application 216 may provide a user interface to allow the operator to configure network connections. For example, the dashboard application 216 may appear in a web browser on the client computing device 110 as an interactive web portal. Authentication to the dashboard application 216 may be performed via login credentials or the like. In some examples, a secondary authentication (e.g. a one time password, periodic detection of a signal by an integrated near field communications (NFC) chip reader, or the like) may also be implemented.

In some examples, the device 120 may connect to the network 130 by accessing a gateway requiring a password and/or other means for identifying and/or authenticating those who connect to it. In some implementations, the network security device 120 may provide, via the dashboard application 216, a means for the operator to establish login credentials or provide other authentication to the gateway. In some implementations, the device 120 may store the login credentials in association with the gateway (e.g. by a gateway identifier or the like) in the memory 204 to allow future connections with the gateway to be established without requiring operator input. Accordingly, the dashboard application 216 may support storage and management of such credentials for any one or more networks.

In response to the request to connect to the network 130, the device 120 proceeds to block 310. At block 310, the device 120, and in particular the processor 200, obtains network information. The network information can include routing information to the network, communication protocols utilized in the network, network traffic information, and the like. For example, the device 120 may send a test packet to the network 130 and extract the routing information, communication protocols, and network traffic information based on a response to the test packet.

At block 315, the device performs a preliminary verification of the network information based on preliminary verification rules stored in the memory 204. For example, the preliminary verification rules may be a subset of the packet header verification rules, or they may be a separate rule set. The preliminary verification rules may define acceptable and unacceptable standards for the routing information, communication protocols, network traffic information, and other network information obtained at block 310.

In some implementations, the device 120 may store a multiple preliminary verification rules based on an assigned security level. Accordingly, prior to performing the preliminary verification, at block 315, the device 120 may determine the assigned security level. For example, the device 120 may have a default security level, or a custom security level may be established by an operator of the client computing device 110, via the dashboard application 216. In some examples, different security levels may be assigned based on login credentials of an operator of the client computing device 110, based on an identifier of the client computing device 110 (i.e. different devices may be assigned to different security levels), based on each session, or the like. The dashboard application 216 may thus provide a user interface at the client computing device 110 for the operator to set or modify the security level in association with any of the above identifiers.

To perform the preliminary verification, the device 120 may identify communication protocols utilized in the network and compare them to acceptable baseline communication protocols defined in the preliminary verification rules. Accordingly, to perform the preliminary verification, the device 120 may identify the communication protocols utilized in the network. For example, the device 120 may compare the structure of data transmissions from the network against pre-stored communication protocol structures to determine what type of communication protocols are used. To perform the verification, the device 120 may compare the identified communication protocols to baseline communication protocols defined in the preliminary verification rules. For example, the preliminary verification rules may define one or more acceptable communication protocols or baseline standards. The preliminary verification rules may further define one or more unacceptable communication protocols. When the device 120 determines that the identified communication protocols meet or match the acceptable baseline standards, the device 120 may determine that the preliminary verification is successful. If the identified communication protocols are determined to be unacceptable (e.g. the communication protocol is itself indicative of a threat or attack to communications between the client computing device 110 and the network 130), the device 120 may determine that the preliminary verification is unsuccessful. For example, a lower security level, certain communication protocols may be flagged for monitoring over the duration of the session while still allowing for a successful preliminary verification. At a higher security level, the same communication protocol may prompt the device 120 to determine that the preliminary verification is unsuccessful and take immediate action (e.g, to prevent connection to the network 130).

In another example, to perform the preliminary verification, the device 120 may obtain a network routing path and verify the network routing path according to the preliminary verification rules, and based on locations of points of the routing path. In particular, the the points on the routing paths may be associated with geographic locations. Certain geographic locations may be indicative of a potential threat or attack to the communications between the client computing device 110 and the network 130. Accordingly, the preliminary verification rules may define a restricted location list associating a restriction level to a geographic location. Table 1, below, illustrates an example restricted location list stored in the memory 204.

TABLE 1

Restricted Location List

| Geographic Location | Restriction Level |
|---|---|
| Canada | No Restrictions |
| China | Restricted Access |
| Russia | No Access |
| . . . | . . . |

As shown above, the restricted location list includes a geographic location and a restriction level of the geographic location. For example, some locations may have a restricted access, for example based on further verification rules or the like. Other locations may have no access, thereby indicating that any communications between the network 130 and the client computing device 110 routed through the given location should be terminated. In some implementations, the restricted location list can further define one or more actions to be taken corresponding to each geographic location or each restriction level. In some implementations, restriction levels may be assigned based on IP addresses (e.g. individual addresses and/or ranges) or domain names. In some implementations, the restricted location list may only include geographic locations having a restriction level (i.e. restricted access, no access, or the like), and locations not on the list may be determined to have no restriction level (i.e. no restriction).

Accordingly, to perform the preliminary verification, the device 120 may determine whether one or more locations of the current routing path match locations on the restricted location list. When none of the locations of the current routing path match the restricted locations on the restricted location list, the verification is determined to be successful. That is, none of the locations have a restriction level (e.g. have an indication of "no restriction" or are not on the restricted location list). At a lower security level, a restriction level of "restricted access" may allow the device to determine that the preliminary verification is successful, while flagging the geographic location for monitoring over the duration of the session. At a higher security level, the restriction level of "restricted access" may prompt the device to determine that the preliminary verification is unsuccessful.

At block 320, the device 120 determines whether the verification is successful based on the results of the preliminary verification, and in accordance with the assigned security level. If the verification is successful, the device 120 proceeds to block 325.

At block 325, the device 120 may connect to the network 130. In particular, the processor 200 may control the communications interface 208 to connect to the network 130. The device 120 may further store the network information in the memory 204. In particular, the network information obtained at block 310 of the session may provide a snapshot of the configuration as of the initialization of connection. Accordingly, certain changes from the initial configuration may be determined to be a threat or attack, as will be described further below.

If, at block 320, the device 120 determines that the verification is unsuccessful, the device 120 proceeds to block 330. At block 330, the device 120 denies the request to connect to the network 130.

Figure 4:
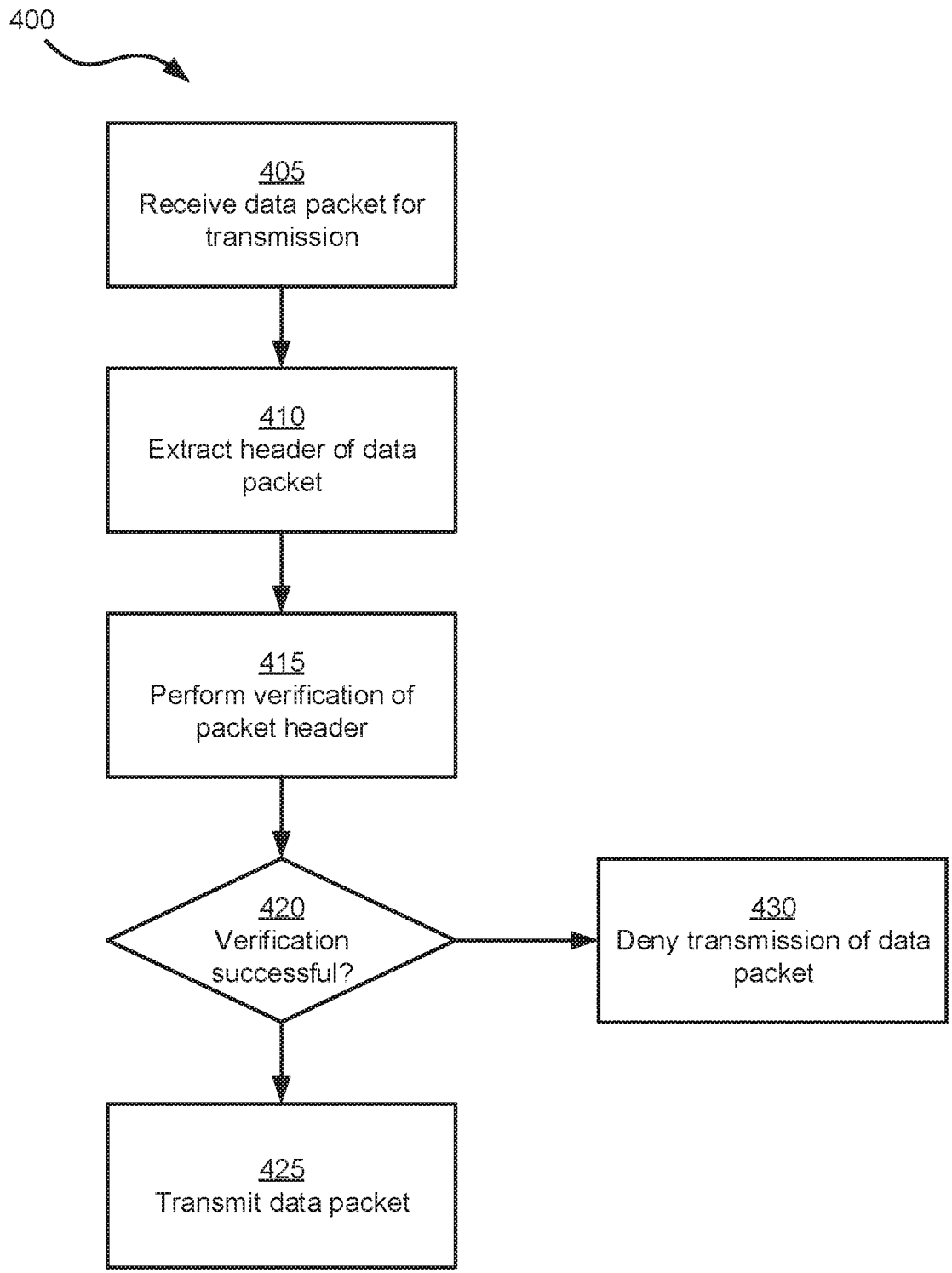
FIG. 4 depicts a flowchart of an example method of performing a packet header verification in the system of FIG. 1.

Referring now to FIG. 4, an example method 400 for mediating communications is depicted. In particular, the method 400 is for verifying the integrity of a data packet. The method 400 will be described in conjunction with its performance in the system 100, and in particular, with reference to the components illustrated in FIGS. 1 and 2. It is contemplated that in other implementations, the method 400 can be performed by other suitable systems.

At block 405, the network security device 120 receives a packet for transmission between the network 130 and the client computing device 110 during a session. For example, the packet may be an outgoing packet from the client computing device 110 for transmission to the network 130, or the packet may be an incoming packet from the network 130 for transmission to the client computing device 110.

At block 410, the network security device 120, and in particular, the processor 200, extracts a header of the packet. Specifically, the packet includes a header and a body. The packet header can include addressing information and other control information for packet identification and delivery. For example, the packet header can include routing information to identify a path through which the packet travelled from its source to its destination. The packet header can further include sequencing information to allow identification of the context of the packet in a session (e.g. as a response to a request or similar). Generally, the packet header may be formatted according to standard internet communication protocols, including standard lengths, sizes, order, and formatting of the various information included in the packet header. The packet further includes a body or payload containing the information to be delivered to the destination. Thus, at block 410, the device 120 extracts the header containing addressing and control information for further processing and verification.

At block 415, the network security device 120, and in particular, the processor 200, performs a verification of structure and content of the header extracted at block 410. Specifically, the verification may be performed based on the packet header verification rules stored in the memory 204. The packet header verification rules may specify one or more rules for acceptable structure and/or content of the packet header extracted at block 410. For example, the rules may be based on the routing path defined in the header, the sequencing information defined in the header, the structure of the communication protocols used in the header, or the like.

As with the preliminary verification rules, the device 120 may store packet header verification rules in association with an assigned security level. Accordingly, prior to performing the verification, the device 120 may determine the assigned security level. In some implementations, a different security level may be assigned to the preliminary verification, and the packet header verifications performed over the duration of the session.

In an example, the network security device 120 may be configured to perform the verification based on a current routing path of the packet. In particular, the current routing path may define a path through which the packet travelled from its source to its destination (e.g. from a source computing device via the network 130 to the client computing device 110). The current routing path can include one or more points (e.g. representing routers, access points, or the like) through which the packet was communicated. The points may be associated with internet protocol (IP) addresses, locations, and other identification information.

In some examples, the current routing path verification may be on a consistency of the routing path over a session. In particular, to perform the verification, the network security device 120 may first be configured to obtain a stored routing path from the memory 204. For example, the stored routing path may be stored in the repository 220, or in a cache for storing session-specific data. Specifically, the stored routing path may be associated with a previous packet that was communicated from the network 130 to the client computing device 110 through the device 120. For example, the previous packet may have been a test packet to determine an initial routing path for the session (e.g. on initialization of the connection between the client computing device 110 and the network 130 during the method 300), or the previous packet may be another data packet transmitted over the duration of the session.

The device 120 may be configured to compare the current routing path of the incoming packet to the stored routing path. In particular, the routing path of data packets is expected to be generally static over the duration of a session. That is, data packets transmitted between the client computing device 110 and the network 130 generally follow the same routing path. Accordingly, if the current routing path and the stored routing path have a threshold similarity (e.g a threshold number of shared or similar points, a threshold percentage of shared or similar points, or the like), the device 120 may determine that the verification is successful. The threshold similarity may be defined in the packet header verification rules stored in the memory 204. If the current routing path and the stored routing path do not have the threshold similarity, the device 120 may determine that the verification is unsuccessful, thereby indicating a potential attack or attack to the communications between the client computing device 110 and the network 130. In some implementations, the packet header verification rules may define different threshold similarities for different security levels.

In some implementations, the current routing path may be compared to more than one stored routing path, for example, to track changes in the routing path. In further implementations, in response to a successful verification of the incoming header (i.e. based on a successful comparison of the current routing path to the stored routing path), the device 120 may store the current routing path in the memory for comparison to routing paths of future incoming packets.

For example, the first three hosts in the routing path from the device 120 may be assumed to belong to the local network, and hence any change to the identity of the first three hosts maybe taken as an attack or threat to security. Verification of the routing path based on consistency and a threshold similarity therefore allows the network security device 120 to autonomously detect and prevent infiltration.

Further, the processor 200 may be configured to analyze the differences in the routing paths to assess severity and impact of the differences.

In other examples, the current routing path verification may be based on a location of points on the routing path. Accordingly, the packet header verification rules may define a restricted location list associating a restriction level to a geographic location. In some implementations, the restricted location list may be the same as that used for the preliminary verification, while in other examples, the preliminary verification rules and the packet header verification rules may define different respective restricted location lists.

Accordingly, to perform the verification, the device 120 may determine whether one or more locations of the current routing path match locations on the restricted location list. When none of the locations of the current routing path match the restricted locations on the restricted location list, the verification is determined to be successful. That is, when none of the locations have a restriction level (e.g. have an indication of "no restriction" or are not on the restricted location list), the verification is determined to be successful. In some implementations, the restricted location list may vary based on security level or session. For example, the dashboard application 216 may provide a user interface at the client computing device 110 for the operator to add or remove geographic locations from the list or modify the restriction level of geographic locations on the list. Further, the user interface may allow the operator to define one or more actions to be taken based when a location of a point on a routing path is determined to match the given geographic location. Such a geographic filter based on geocoding or location information thus allows the device to autonomously assess and warn operators of potential threats or attacks.

In some examples, the device 120 may be configured to perform the verification based on sequencing information of the packet. In particular, the sequencing information may allow identification of the context of the packet in the session. For example, the packet may be destined for transmission to the client computing device 110 as a part of a response to a request (e.g. a download or the like) from the client computing device 110. Accordingly, the sequencing information can include a response sequence identifying the packet as such.

To perform the verification, the device 120 may first obtain session information, for example, from a cache stored in the memory 204. The session information may indicate for example, a session start time, a session identifier, initialization information (e.g. initial routing paths or the like), requests transmitted by the client computing device 110 and responses received from the network 130. The device 120 may further obtain a response sequence from the header of the received packet. The device 120 may then determine whether the response sequence corresponds to the session information. For example, the device 120 may determine whether the response sequence accurately responds to a request transmitted by the client computing device 110. In other examples, the device 120 may determine whether a response has already been received from the network 130. When the device 120 determines that the response sequence corresponds to the session information, the device 120 may further determine that the verification is successful. When the device 120 determines that the response sequence does not correspond to the session information (e.g. a response has already been received, the response sequence does not correspond to a request, or the like), the device 120 further determines that the verification is unsuccessful. The device 120 may thus autonomously determine the validity of the packet in context of the session between the client computing device 110 and the network 130.

In still further examples, the device 120 may be configured to perform the verification based on communication protocols of the packet. In particular, the packet header may be formatted according to standard Internet communication protocols, including commonly accepted lengths, sizes, order, and other formatting of the information included in the packet header. Accordingly, to perform the verification, the device 120 may identify the communication protocols utilized in the structure of the packet header. For example, the device 120 may compare the structure of the packet header against pre-stored communication protocol structures to determine what type of communication protocols are used. To perform he verification, the device 120 may compare the identified communication protocols to baseline communication protocols defined in the packet header verification rules. For example, the baseline communication protocols may identify one or more acceptable communication protocol. In some implementations, the packet header verification rules may further identify unacceptable communication protocols. When the identified communication protocols match the baseline communication protocols, the verification may be determined to be successful. When the identified communication protocols do not match the baseline communication protocols, the verification may be determined to be unsuccessful. In other implementations, when the identified communication protocols are determined to be unacceptable (e.g. the communication protocol utilized is itself indicative of a threat or attack to communications between the client computing device 110 and the network 130), the verification may also be determined to be unsuccessful.

In some implementations, the verification may be a combination of more than one type of verification (e.g. based on routing path consistency, location, sequencing, and structure). For example, the device 120 may require that all types of verifications are successful to determine that the verification is successful. In other examples, the device 120 may prioritize or sequence the types of verifications (e.g, perform one verification, then a subsequent one, and so on). The verifications or types of verifications required, as well as the sequencing of verifications may be defined, for example, based on the assigned security level. Further, the combination of successful and unsuccessful verifications may determine a severity of a security threat. The management of the multiple verifications may be handled by, or in conjunction with the error handling procedure, as will be described further below.

For example, the packet header verification may further be combined with identification of direct attacks, such as via use of a firewall of the device 120 that blocks unsolicited incoming traffic. Further, the device 120 may detect the process of scanning (e.g. port scanning) the client computing device 110, as well as known exploits and fingerprinting attempts. For example, unsolicited or otherwise unknown requests received at the device 120 from the network 130 may receive random responses.

At block 420, the network security device 120 determines whether the verification performed at block 415 is successful. If the verification is determined to be successful, the network security device proceeds to block 425.

At block 425, the network security device 120, and in particular, the processor 200 controls the communications interface 208 to transmit the packet to its destination (i.e. the network 130 or the client computing device 110).

If the verification is determined to be unsuccessful, the network security device 120 proceeds to block 430 for an error handling procedure. The error handling procedure may vary based on the assigned security level, the type or types of verification performed, the particular error condition detected, or a combination of the above. For example, detection of certain geographic locations in the routing path, or certain communication protocols may positively indicate presence of a threat, such as malware, and hence, the network security device 120 may terminate communications between the network 130 and the client computing device. In particular, the processor 200 may control the communications interface 208 to disconnect from the network 130.

In other examples, unsuccessful verification may indicate a benign change in a condition of the network 130 or another non-malicious event. For example, the operator of the client computing device 110 may begin using a high bandwidth application (e.g. video streaming, large file downloads or the like), and hence network usage may increase. Accordingly, responsive to the unsuccessful verification, the network security device 120 may be configured to perform a second verification, for example based on a different type of verification. In other examples, the device 120 may assign a higher security level so that responsive to another unsuccessful verification, further action may be taken (e.g. the connection may be terminated).

In some implementations, the network security device 120 may further provide an indication at the client computing device 110 that the error condition was detected and the action taken by the device 120 in response to the error condition (e.g. the connection was terminated, the security level was increased, or the like). The device 120 may further be configured to provide another type of notification, such as an email, a text message, or other suitable notification that the error condition was detected.

Figure 5:
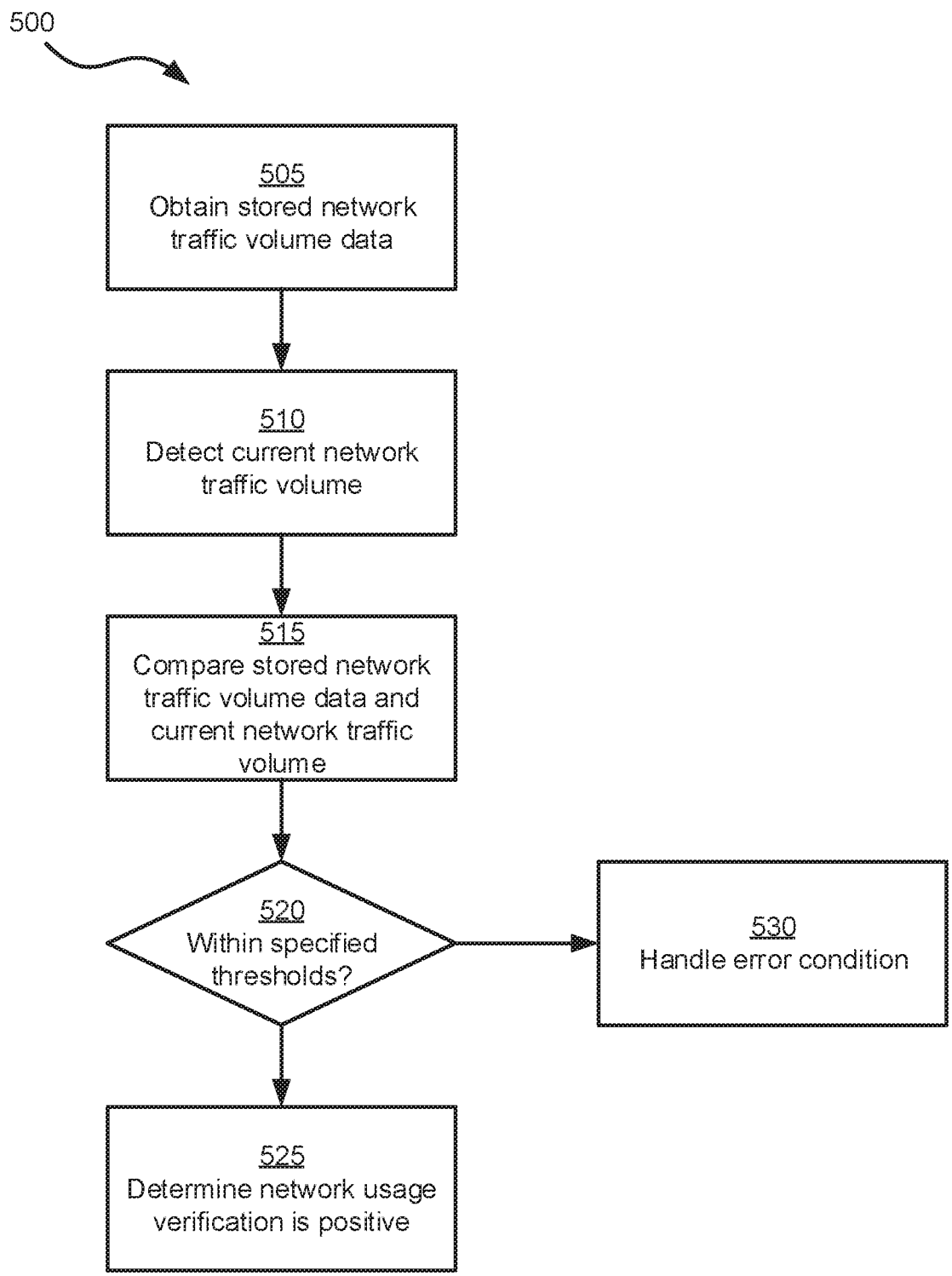
FIG. 5 depicts a flowchart of an example method of performing a network usage verification in the system of FIG. 1.

Referring now to FIG. 5, an example method 500 for mediating communications is depicted. In particular, the method 500 is for performing a network usage verification. The method 500 will be described in conjunction with its performance in the system 100, and in particular, with reference to the components illustrated in FIGS. 1 and 2. It is contemplated that in other implementations, the method 500 can be performed by other suitable systems.

The method 500 is initiated at block 505, for example, responsive to receipt of a packet for transmission between the network 130 and the client computing device 110 during a session. In other examples, the method 500 may be initiated at a predetermined time of day, or at predetermined intervals. For example, the device 120 may include an independent, real-time clock to track the time of day and/or track passage of the predetermined intervals. At block 505, the network security device 120 obtains stored network traffic volume data from the memory 204. The stored network traffic volume data may include one or more of: traffic by individual ports, traffic to or from specified hosts, traffic to or from specified networks, and traffic to or from specified geographic regions. In particular, the stored network traffic volume data may indicate an average or total traffic volume of a previous iteration of the method 500. The stored network traffic volume data may be rolling averages over specified time intervals and/or averages over distinct intervals. In some implementations, the stored network traffic volume data can include multiple measurements obtained over several time intervals.

At block 510, the device 120 detects a current network traffic volume. Specifically, the device 120 may detect a corresponding current measurement of the one or more of: traffic by individual ports, traffic to or from specified hosts, traffic to or from specified networks, and traffic to or from specified geographic regions.

At block 515, the device 120 compares the stored network traffic volume data and the current network traffic volume to determine whether they are within a threshold similarity. For example, the threshold similarity may be based on one or more of a percentage difference, a standard deviation difference, or an absolute value difference. In particular, the memory 204 may store network traffic rules defining a threshold similarity to apply. For example, the threshold similarity may vary based on different time intervals, different types of volume, different security levels, and the like.

In an example, the network traffic rules may define an increase in volume of 150% over previously recorded averages to be significant (i.e. an increase in volume of 150% may not meet the threshold similarity requirements). In other examples, the threshold similarity may be defined as 125%, 175%, 200% or other values. In further examples, an increase in volume may be deemed significant (i.e. not meeting the threshold similarity requirements) if it exceeds previous averages by one standard deviation or two standard deviations. In further examples, an increase of 50% of total traffic volume (e.g. as measured over all ports) may be deemed significant, while the threshold for an increase in traffic from an individual port may be 25%. Multiple thresholds and averages may also apply to the same type of traffic; for example, total network traffic volume (e.g. as measured over all ports) may measured over both 500 milliseconds and 2 seconds, and the threshold similarity may be defined over either or both intervals. In some implementations, a lower threshold similarity (i.e. requiring the stored network traffic volume data and the current network traffic volume data to be more similar) may be applied at a higher security level relative to the threshold similarity applied at a lower security level.

At block 520, the device 120 determines whether the stored network traffic volume data and the current network traffic volume are within the specified threshold(s). When the determination is positive, the device 120 proceeds to block 525.

At block 525, the device 120 determines that network usage verification is positive. In some implementations, the device 120 can store the current network traffic volume in the memory 204.

If at block 520, the determination is negative, the device 120 proceeds to block 530. At block 530, the device 120 determines that the network usage verification is negative and may proceed to the error handling procedure.

Figure 6:
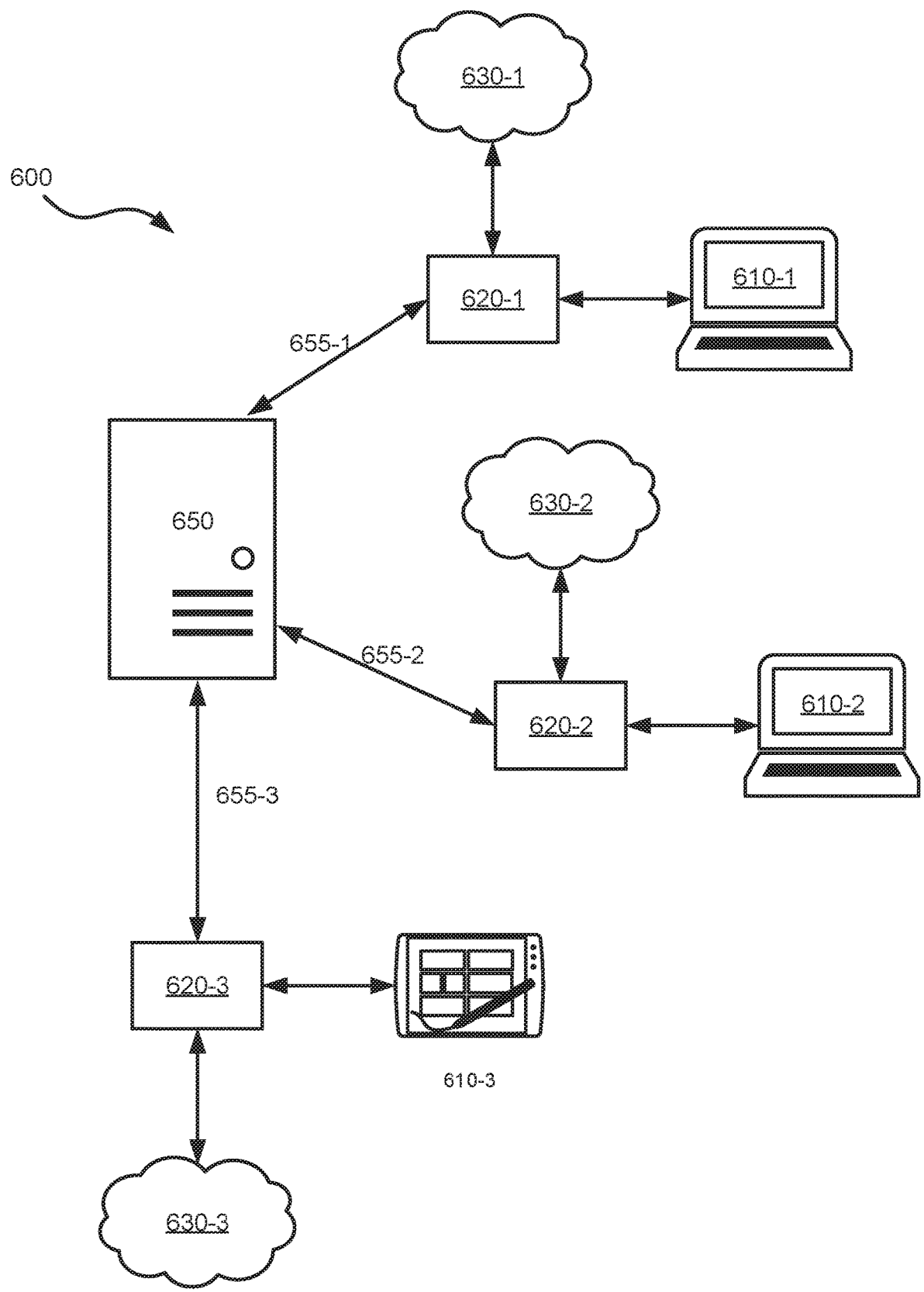
FIG. 6 depicts an example system for securing a network connection in communication with a centralized command center.

FIG. 6 depicts an example system 600 including a plurality of network security devices 620-1, 620-2, and 620-3 (referred to generically as a device 620, and collectively as devices 620; this nomenclature is used elsewhere herein) connected to respective client computing device 610-1, 610-2, and 610-3 and to respective networks 630-1, 630-2, and 630-3. In the system 600, the network security devices 620 are further connected to a centralized command center 650 via encrypted communication links 655-1, 655-2, and 655-3. The centralized command center 650 may be hosted on a server and may be configured to manage a fleet of network security devices 620.

In operation, upon detection of a threat by a device 620, such as by identification of an unsuccessful verification of network information, packet header information, network traffic, or the like, the results of the verification may be communicated by the encrypted communication link 655 to the centralized command center 650 for further analysis or processing. In some implementations, all verifications, regardless of success may be sent to the centralized command center 650 for analysis, further processing, or logging. An operator of the centralized command center 650 may therefore have oversight of the fleet of network security devices 620.

The network security devices 620 may further be configured to respond to commands from the centralized command center 650 to allow centralized control of the fleet upon detection of a threat. For example, a processor of a network security device 620 may be configured to in response to receipt of a disconnect command from the centralized command center 650, control a communications interface of the network security device 620 to disconnect from its respective network 630. In other examples, the processor may be configured to: in response to receipt of a reset command from the centralized command center 650, reset the device 620 to factory settings. That is, the reset may erase all stored configuration settings (e.g. operator credentials, network credentials, custom security level settings, and the like) from the memory of the device 620.

Figure 7:
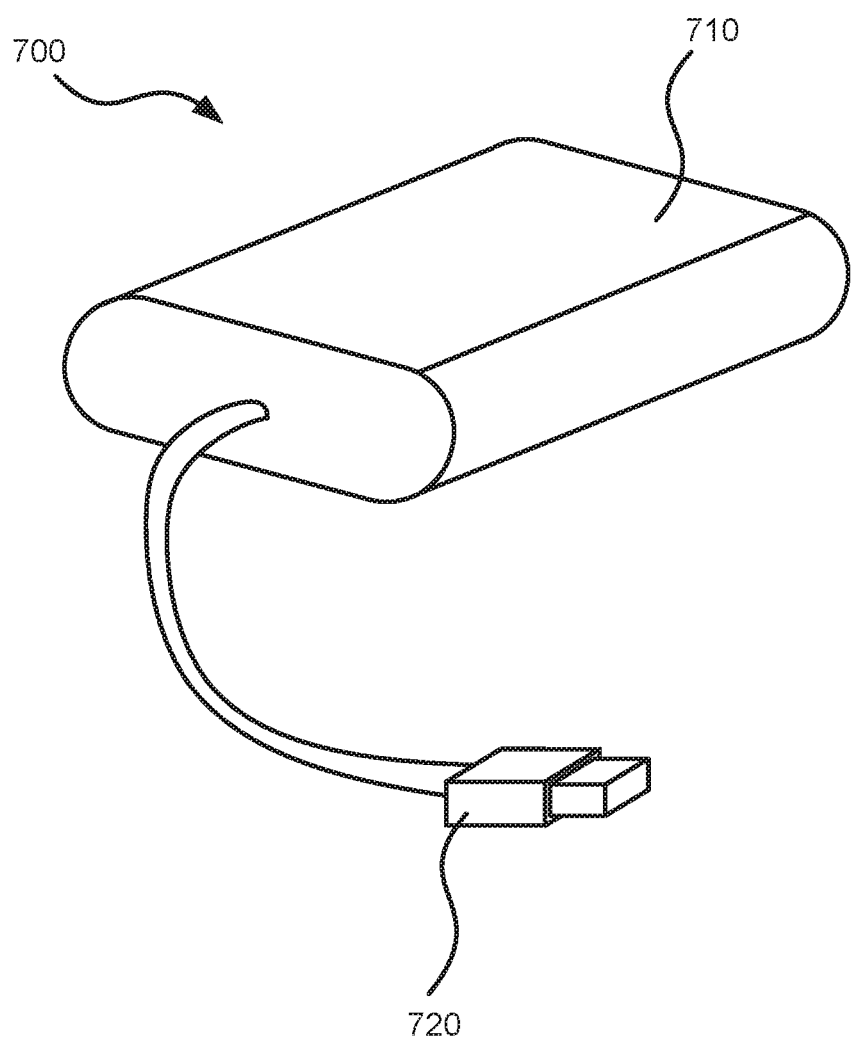
FIG. 7 depicts a perspective view of example portable network security device.

FIG. 7 depicts an example network security device 700 as a stand-alone portable device. The network security device 700 includes a body 710 housing a processor and a memory (not shown), as well as an antenna (not shown) for wireless network communications. The network security device 700 further includes a USB connector 720 configured to engage with a USB receptacle of a host computer, thereby providing a connection from the device 700 to the host computer. In other implementations, the connector 720 may have a different configuration to suitably engage with a receptacle of the host computer to provide a wired connection between the device 700 and the host computer. The network security device 700 may therefore be portable (e.g. small enough to be conveniently carried, such as in a pocket, handbag, or briefcase) while providing network security features. In other implementations, features of the network security device may be integrated into a computing device.

Figure 8:
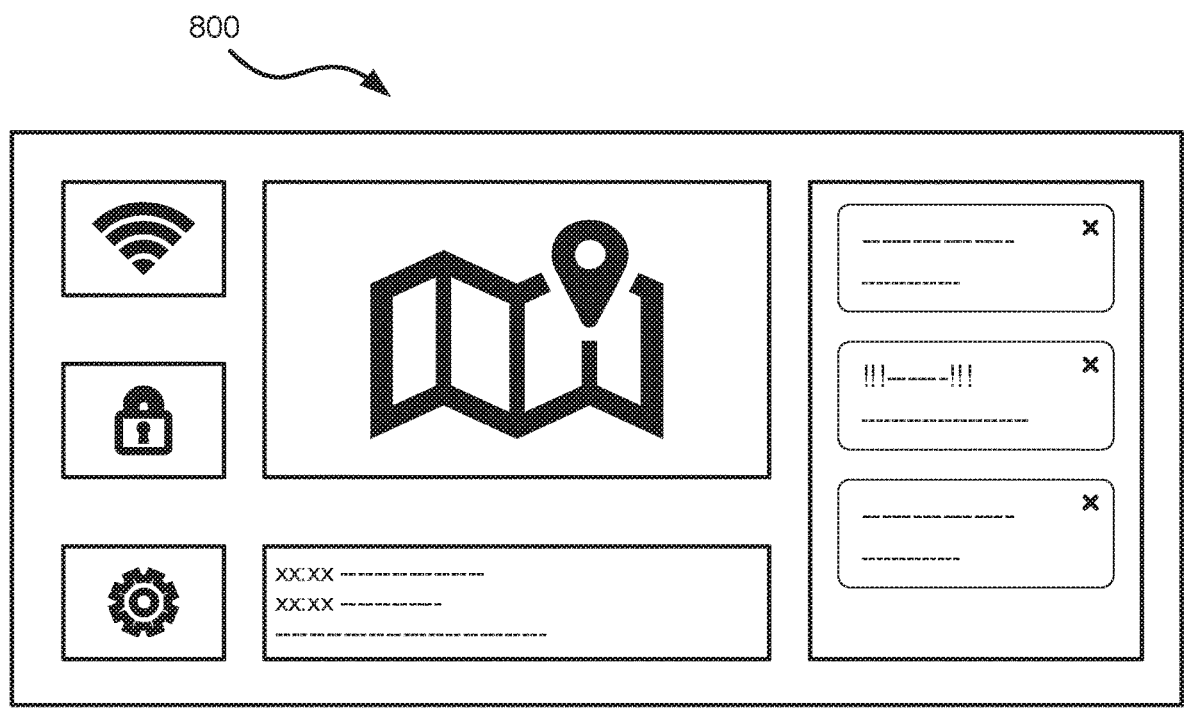
FIG. 8 depicts an example user interface of a dashboard application in the system of FIG. 1.

FIG. 8 depicts an example user interface 800 of the dashboard application 216 as presented on a display of the client computing device 110. For example, the dashboard application 216 may be executable by the client computing device 110 to generate the user interface 800. The user interface 800 may include an interactive portal to allow users to set up network connections, security settings, and authenticate (e.g. provide credentials) to the network security device 120.

The user interface 800 may further include an interactive map illustrating countries that the device is connected to (e.g. via the network). The interactive map may provide further information of current versus historical data, or example via depictions in different colors, patterns, or the like. The interactive map may further illustrate countries identified on the restricted access list via depictions in further different colors, patterns, or the like.

The user interface 800 may further be configured to present one or more of: a heat map of the network, a list of raw attack attempts and their sources, identification of high-level attacks according to analysis of the raw combined information of each individual attack attempt, and a history of actions taken to secure the client computing device 110 and the decision making associated therewith. The user interface 800 may further provide an interactive web portal indicating session information, such as the number of connections established during the session, total network traffic over the duration of the session, average usage speed, system resource consumption, system logs, and the like.

The user interface 800 may further be provided with a notification region to provide users with notifications and alerts, as well as reflecting actions taken by the device 120 according to the level of severity of an event detected by the device 120. For example, the actions may include one or more of: providing a notification at the user interface 800, providing a desktop notification at the client computing device 110, providing audio alerts at the client computing device 110, and automatically disconnecting the device 120 from the network 130. In some implementations, the user interface 800 may provide configuration options for managing the notification (e.g. by dismissing the notification), and the type of action corresponding to the event detected.

A network security device may thus mediate communications between a client computing device and a network. The network security device may analyze, compare, process, and verify network information, combine different results, and decide whether the connection is at risk. In particular, the network security device uses detailed identification of raw information received during a network session and, through analysis of that information, assigns weights to identified threats according to their severity and impact. Thus, when an attack occurs, the network security device may isolate and analyze each attack vector, establish weights for each attack vector, and cross reference them with each other. Accordingly, the network security device may react differently when confronted by a combination of weak attack vectors as compared to a combination of strong attack vectors. Further, the network security device may respond accordingly to a combination of vectors with different weight, which, when combined would pose a serious threat to communications to and from the client computing device. The network security device may perform these verifications and identifications dynamically, constantly, and autonomously (i.e. without requiring an operator's supervision or approval) during a session.

The scope of the claims should not be limited by the embodiments set forth in the above examples, but should be given the broadest interpretation consistent with the description as a whole.

The invention claimed is:

1. A network security device to mediate communications between a client computing device and a network, the network security device comprising:
   a memory storing packet header verification rules defining parameters for structure and content of packet headers;
   a communications interface to connect to the client computing device and the network; and
   a processor interconnected with the memory and the communications interface, the processor configured to:
      in response to receiving an incoming packet from the network for transmission to the client computing device, extract an incoming header from the incoming packet;
      perform a verification of structure and content of the incoming header according to the packet header verification rules by:
         obtaining a current routing path from the incoming header of the incoming packet;
         obtaining a stored routing path from the memory;
         determining whether the stored routing path and the current routing path include a threshold number of similar points, wherein the threshold number is defined in the packet header verification rules;

determining whether one or more locations of the current routing path match locations on a restricted location list defined in the packet header verification rules; and when (1) the stored routing path and the current routing path are determined to include the threshold number of similar points and (2) none of the locations of the current routing path match the locations on the restricted location list, determining that the verification of the incoming header is successful; and in response to a successful verification of the incoming header, transmit the incoming packet to the client computing device.

2. The network security device of claim 1, wherein the processor is further configured to: in response to a successful verification of the incoming header, store the current routing path in the memory.

3. The network security device of claim 1, wherein the processor is further configured to perform the verification of the incoming header by:
obtaining session information from the memory;
obtaining a response sequence from the incoming header of the incoming packet; and
when the response sequence corresponds to the session information, determining that the verification of the incoming header is successful.

4. The network security device of claim 1, wherein the processor is further configured to perform the verification of the incoming header by:
identifying communication protocols utilized in the structure of the incoming header; and
when the identified communication protocols match baseline communication protocols defined in the packet header verification rules, determining that the verification of the incoming header is successful.

5. The network security device of claim 1, wherein, in response to a request from the client computing device to connect to the network, the processor is configured to:
obtain network information;
perform a preliminary verification on the network information based on preliminary verification rules stored in the memory; and
in response to a successful preliminary verification, control the communications interface to connect to the network.

6. The network security device of claim 5, wherein the processor is configured to perform the preliminary verification by:
identifying communication protocols utilized in the network; and
verifying the identified communication protocols according to the preliminary verification rules.

7. The network security device of claim 5, wherein the processor is configured to perform the preliminary verification by:
obtaining a network routing path and storing the network routing path in the memory; and
verifying the network routing path according to the preliminary verification rules.

8. The network security device of claim 1, wherein the processor is further configured to:
in response to receiving an outgoing packet from the client computing device for transmission to the network, extract an outgoing header from the outgoing packet;
perform a verification of structure and content of the outgoing header according to the packet header verification rules; and
in response to a successful verification of the outgoing header, transmit the outgoing packet to the network.

9. The network security device of claim 8, wherein the processor is configured to perform the verification of the outgoing header by:
obtaining a current routing path from the outgoing header of the outgoing packet;
determining whether one or more locations of the current routing path match locations on a restricted location list defined in the packet header verification rules; and
when none of the locations of the current routing path match the locations on the restricted location list, determining that the verification of the outgoing header is successful.

10. The network security device of claim 1, wherein the processor is further configured to perform a network usage verification by:
obtaining stored network traffic volume data from the memory;
detecting a current network traffic volume;
determining whether the stored network traffic volume data and the current network traffic volume are within a threshold similarity; and
when the determination is positive, determining that the verification is successful.

11. The network security device of claim 10, further comprising storing the current network traffic volume in the memory.

12. The network security device of claim 10, wherein the current network traffic volume comprises one or more of: traffic by individual ports, traffic to or from specified hosts, traffic to or from specified networks, and traffic to or from specified geographic regions.

13. The network security device of claim 10, wherein the processor determines whether the stored network traffic volume data and the current network traffic volume are within a threshold similarity based on one or more of: a percentage difference; and a standard deviation difference.

14. The network security device of claim 1, wherein the communications interface is further configured to utilize an encrypted communication protocol.

15. The network security device of claim 14, wherein the processor is further configured to:
in response to a domain name system (DNS) request, retrieve a pre-stored address of a trusted domain name server from the memory; and
control the communications interface to forward the DNS request to the trusted domain name server via the encrypted communication protocol.

16. The network security device of claim 14, wherein the processor is further configured to communicate with a centralized command center via the communications interface using the encrypted communication protocol.

17. The network security device of claim 16, wherein the processor is further configured to: in response to receipt of a disconnect command from the centralized command center, control the communications interface to disconnect from the network.

18. The network security device of claim 16, wherein the processor is further configured to: in response to receipt of a reset command from the centralized command center, reset the device to factory settings.

19. The network security device of claim 1, wherein the memory further stores a dashboard application executable by the client computing device.

20. The network security device of claim 19, wherein the processor is configured to: in response to an unsuccessful verification, provide an indication at the client computing device via the dashboard application.

21. The network security device of claim 1, wherein the processor is configured to: in response to an unsuccessful verification, controlling the communications interface to disconnect from the network.

22. A method of mediating communications between a client computing device and a network, the method comprising:

storing packet header verification rules defining parameters for structure and content of packet headers;
 connecting to the client computing device and the network; and
 in response to receiving an incoming packet from the network for transmission to the client computing device, extracting an incoming header from the incoming packet, and performing a verification of structure and content of the incoming header according to the packet header verification rules by:
  obtaining a current routing path from the incoming header of the incoming packet;
  obtaining a stored routing path from memory;
  determining whether the stored routing path and the current routing path include a threshold number of similar points, wherein the threshold number is defined in the packet header verification rules;
  determining whether one or more locations of the current routing path match locations on a restricted location list defined in the packet header verification rules; and
  when (1) the stored routing path and the current routing path are determined to include the threshold number of similar points and (2) none of the locations of the current routing path match the locations on the restricted location list, determining that the verification of the incoming header is successful; and
 in response to a successful verification of the incoming header, transmitting the incoming packet to the client computing device.

23. The method of claim 22, wherein performing the verification of the incoming header comprises:
 identifying communication protocols utilized in the structure of the incoming header; and
 when the identified communication protocols match baseline communication protocols defined in the packet header verification rules, determining that the verification of the incoming header is successful.

24. The method of claim 22, wherein the method comprises, in response to a request from the client computing device to connect to the network:
 obtaining network information;
 performing a preliminary verification on the network information based on preliminary verification rules that have been stored; and
 in response to a successful preliminary verification, connecting to the network.

25. The method of claim 24, wherein performing the preliminary verification comprises:
 identifying communication protocols utilized in the network; and
 verifying the identified communication protocols according to the preliminary verification rules.

26. The method of claim 24, wherein performing the preliminary verification comprises:
 obtaining a network routing path and storing the network routing path; and
 verifying the network routing path according to the preliminary verification rules.

27. The method of claim 22, further comprising:
 in response to receiving an outgoing packet from the client computing device for transmission to the network, extracting an outgoing header from the outgoing packet;
 performing a verification of structure and content of the outgoing header according to the packet header verification rules; and
 in response to a successful verification of the outgoing header, transmitting the outgoing packet to the network.

28. The method of claim 27, wherein performing the verification of the outgoing header comprises:
 obtaining a current routing path from the outgoing header of the outgoing packet;
 determining whether one or more locations of the current routing path match locations on a restricted location list defined in the packet header verification rules; and
 when none of the locations of the current routing path match the locations on the restricted location list, determining that the verification of the outgoing header is successful.

29. The method of claim 22, further comprising performing a network usage verification by:
 obtaining stored network traffic volume data;
 detecting a current network traffic volume;
 determining whether the stored network traffic volume data and the current network traffic volume are within a threshold similarity; and
 when the determination is positive, determining that the verification is successful.

30. The method of claim 29, further comprising storing the current network traffic volume.

31. The method of claim 29, wherein the current network traffic volume comprises one or more of: traffic by individual ports, traffic to or from specified hosts, traffic to or from specified networks, and traffic to or from specified geographic regions.

32. The method of claim 29, comprising determining whether the stored network traffic volume data and the current network traffic volume are within a threshold similarity based on one or more of: a percentage difference; and a standard deviation difference.

33. The method of claim 22, comprising utilizing an encrypted communication protocol.

34. The method of claim 33, further comprising:
 in response to a domain name system (DNS) request, retrieving a pre-stored address of a trusted domain name server; and
 forwarding the DNS request to the trusted domain name server via the encrypted communication protocol.

35. The method of claim 34, further comprising communicating with a centralized command center using the encrypted communication protocol.

36. The method of claim 35, further comprising: in response to receipt of a disconnect command from the centralized command center, disconnecting from the network.

37. The method of claim 35, further comprising: in response to receipt of a reset command from the centralized command center, resetting to factory settings.

38. The method of claim 22, comprising storing a dashboard application executable by the client computing device.

39. The method of claim 38, comprising: in response to an unsuccessful verification, providing an indication at the client computing device via the dashboard application.

40. The method of claim 22, comprising: in response to an unsuccessful verification, disconnecting from the network.

\* \* \* \* \*